United States Patent
Reitnouer

[11] Patent Number: 6,109,684
[45] Date of Patent: Aug. 29, 2000

[54] UNITIZED FLATBED TRAILER STRUCTURE AND CONTAINER TRUCK FLOOR STRUCTURE

[76] Inventor: Miles A. Reitnouer, 130 Jessica Ct., Leesport, Pa. 19533

[21] Appl. No.: 09/039,961

[22] Filed: Mar. 16, 1998

[51] Int. Cl.[7] .................................................. B62D 21/03
[52] U.S. Cl. ..................... 296/182; 296/204; 280/795; 280/800
[58] Field of Search .................................. 296/181–183, 296/204; 280/781, 795, 800

[56] References Cited

U.S. PATENT DOCUMENTS

| | | |
|---|---|---|
| 1,962,497 | 6/1934 | Francis . |
| 2,485,047 | 10/1949 | Greig . |
| 2,773,718 | 12/1956 | Bohlen . |
| 2,818,272 | 12/1957 | DeLay . |
| 2,851,281 | 9/1958 | Felburn ........................ 296/181 X |
| 3,003,810 | 10/1961 | Kloote et al. . |
| 3,096,996 | 7/1963 | Cole . |
| 3,163,434 | 12/1964 | Krueger . |
| 3,197,228 | 7/1965 | Felburn ........................ 280/800 X |
| 3,319,393 | 5/1967 | Tantlinger et al. ............. 296/182 X |
| 3,393,920 | 7/1968 | Ehrlich . |
| 3,692,349 | 9/1972 | Ehrlich . |
| 3,843,156 | 10/1974 | Alfriend, Jr. et al. . |
| 4,221,427 | 9/1980 | Sentle, Jr. et al. . |
| 4,232,884 | 11/1980 | DeWitt . |
| 4,270,334 | 6/1981 | Bender ........................ 52/827 |
| 4,488,732 | 12/1984 | Lehmann et al. ............. 280/781 |
| 4,534,589 | 8/1985 | Booher ........................ 296/182 |
| 4,656,809 | 4/1987 | Wilson . |
| 4,671,562 | 6/1987 | Broadbent . |
| 4,787,669 | 11/1988 | Wante . |
| 4,906,021 | 3/1990 | Rowe et al. . |
| 4,951,992 | 8/1990 | Hockney . |
| 5,054,843 | 10/1991 | Gray . |
| 5,085,025 | 2/1992 | Gaddis . |
| 5,188,418 | 2/1993 | Walworth, Jr. et al. . |
| 5,205,587 | 4/1993 | Orr . |
| 5,401,050 | 3/1995 | Baker . |
| 5,403,063 | 4/1995 | Sjostedt et al. ............... 296/281 |
| 5,417,453 | 5/1995 | VanDenberg ................. 296/182 X |
| 5,474,331 | 12/1995 | Booher . |
| 5,555,699 | 9/1996 | Borthick et al. .............. 52/801.11 |
| 5,558,369 | 9/1996 | Cornea et al. . |
| 5,655,792 | 8/1997 | Booher . |

FOREIGN PATENT DOCUMENTS

| | | |
|---|---|---|
| 379825 | 8/1990 | European Pat. Off. ........ B62D 21/00 |
| 807566 | 11/1997 | European Pat. Off. ........ B62D 25/20 |
| 2695086 | 3/1994 | France ........................ 296/183 |
| 245170 | 4/1987 | Germany ..................... 296/204 |
| 9010720 | 9/1990 | Germany ..................... B60P 1/64 |
| 219557 | 8/1942 | Switzerland . |
| 816845 | 3/1981 | U.S.S.R. ..................... 280/800 |

OTHER PUBLICATIONS

Patent Abstract of Japan, vol. 005, No. 083 (M–071), May 30, 1981 And JP 56031874A (Shin Meiwa Ind Co Ltd.).

Primary Examiner—Dennis H. Pedder
Attorney, Agent, or Firm—Caesar, Rivise, Bernstein, Cohen & Pokotilow, Ltd.

[57] ABSTRACT

A flatbed trailer design that unitizes the three main components of a trailer bed, the main rails, the cross members and the floor, to create a lightweight and stronger trailer. The trailer design comprises two main rails having dual webs and a plurality of shouldered cross members. These dual web main rails and shouldered cross members have top flanges that are formed by the upper plane of the flooring members. In addition, intermediate flooring supports are used between cross members. A flooring/cross member design for box-type (e.g., van) trailers, box-type bodies or even container bodies, whose top flanges of the cross members are formed by the upper plane of the flooring and whose flooring supports are intermediate, exhibiting a combined lower height. This result provides more interior space for these type of trailers while maintaining, or even reducing, the size of the cross member. This unitized flooring also forms the lower flange of the box or chassis, thereby increasing the strength of the box itself.

9 Claims, 14 Drawing Sheets

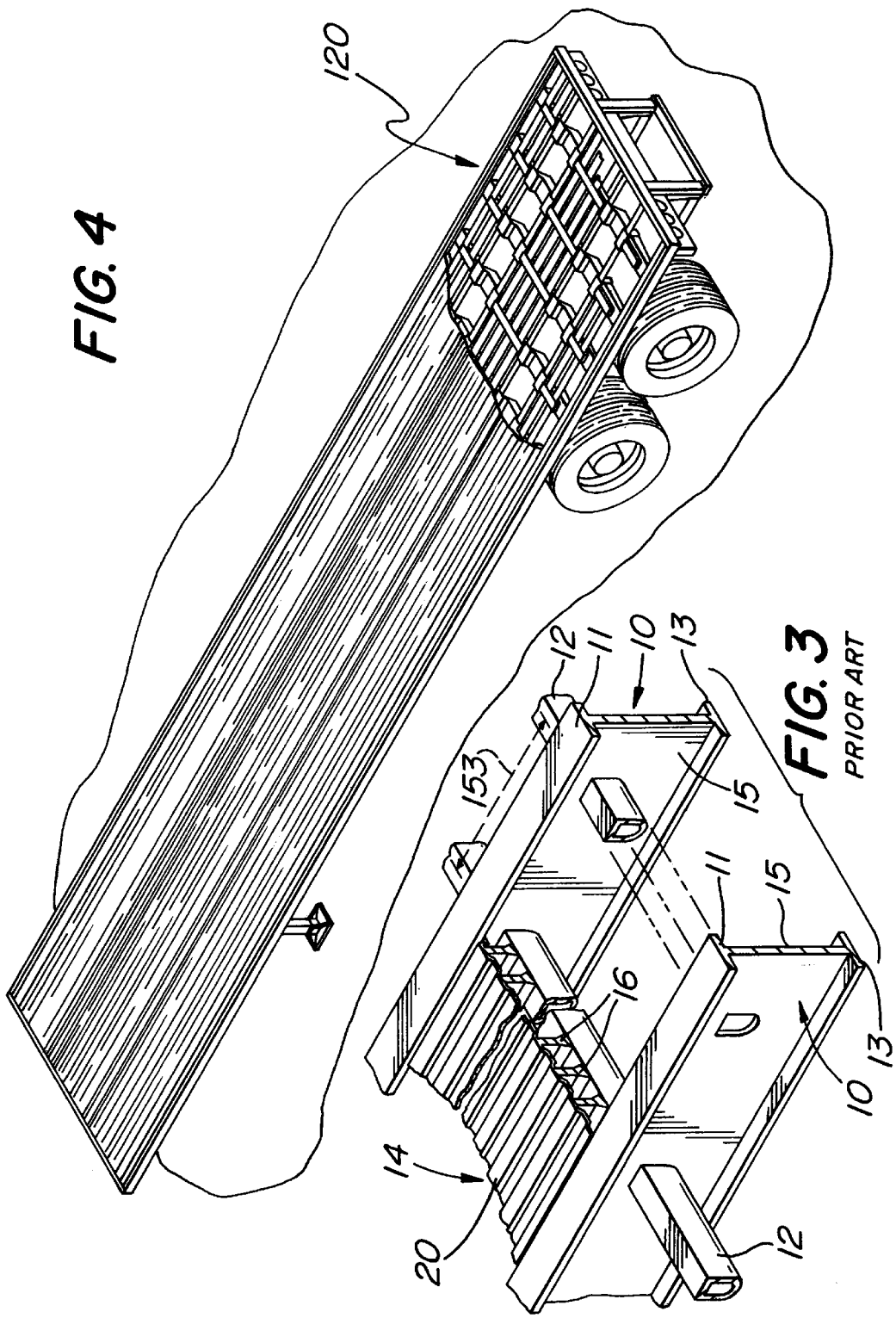

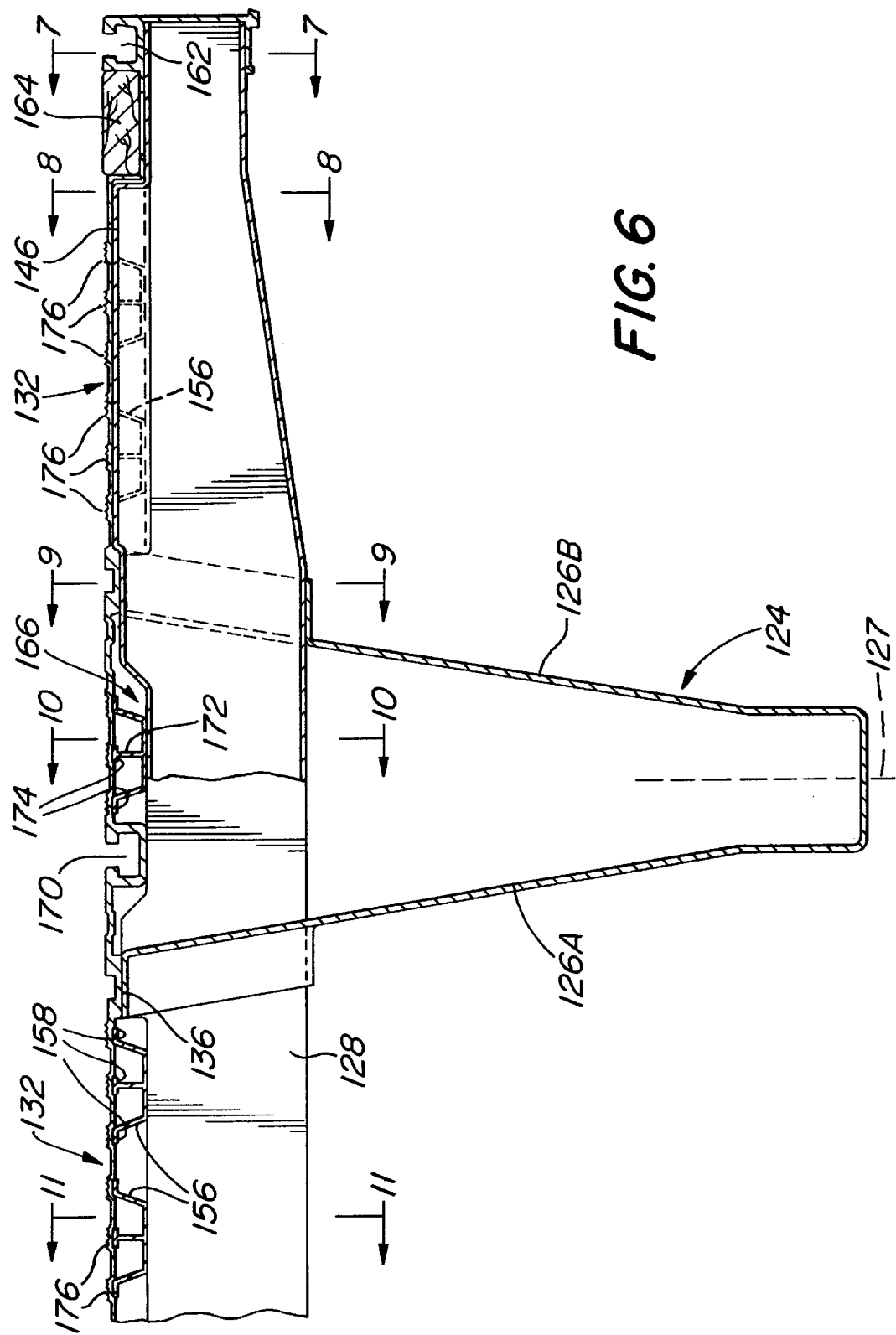

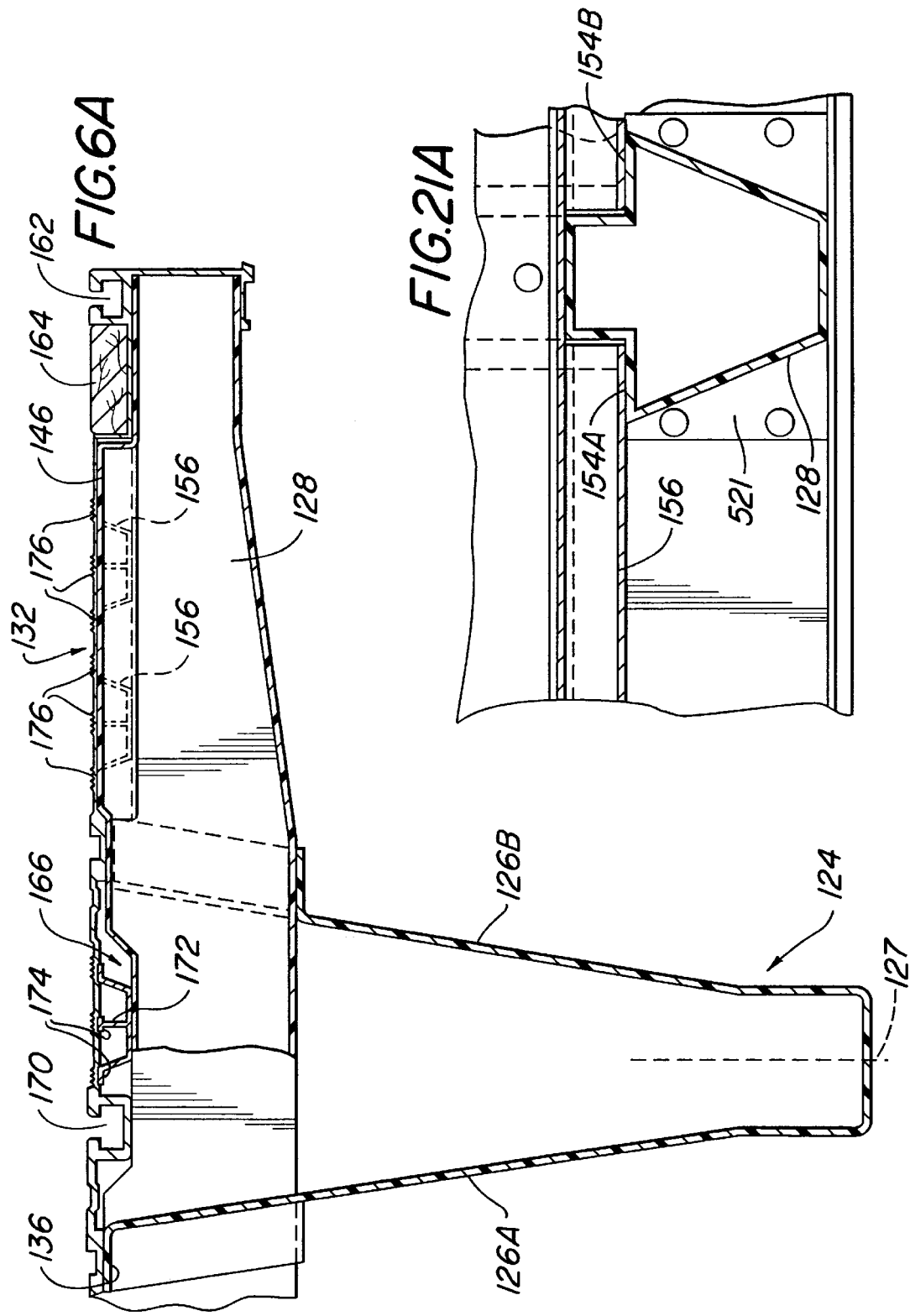

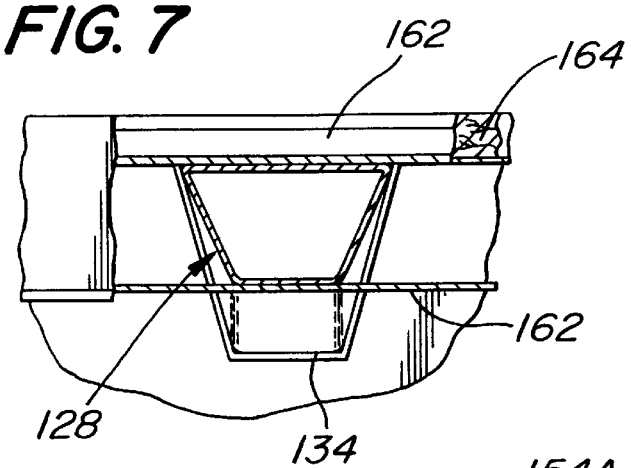
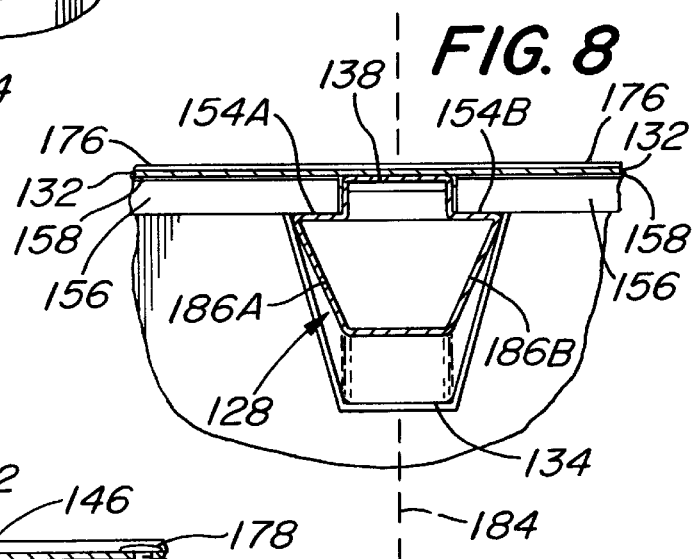
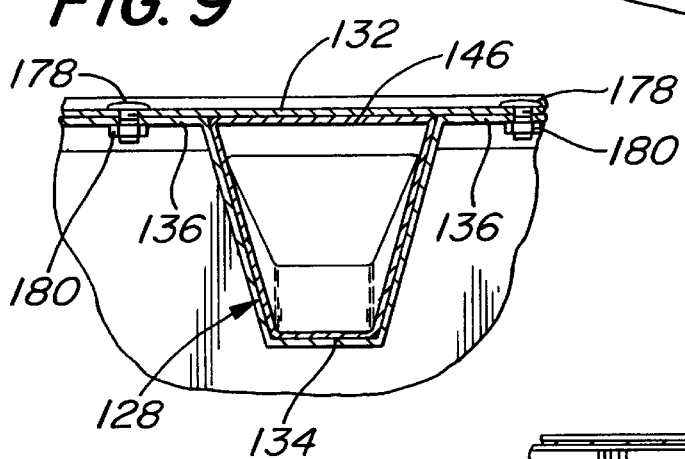
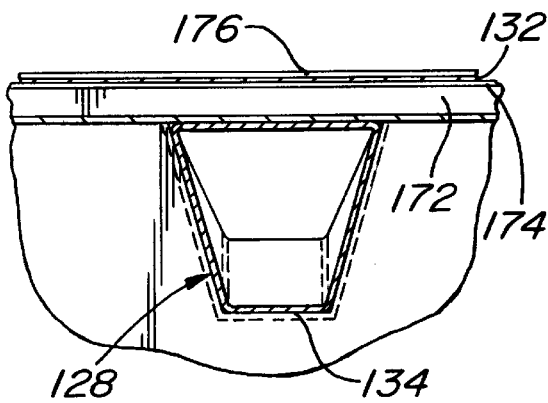

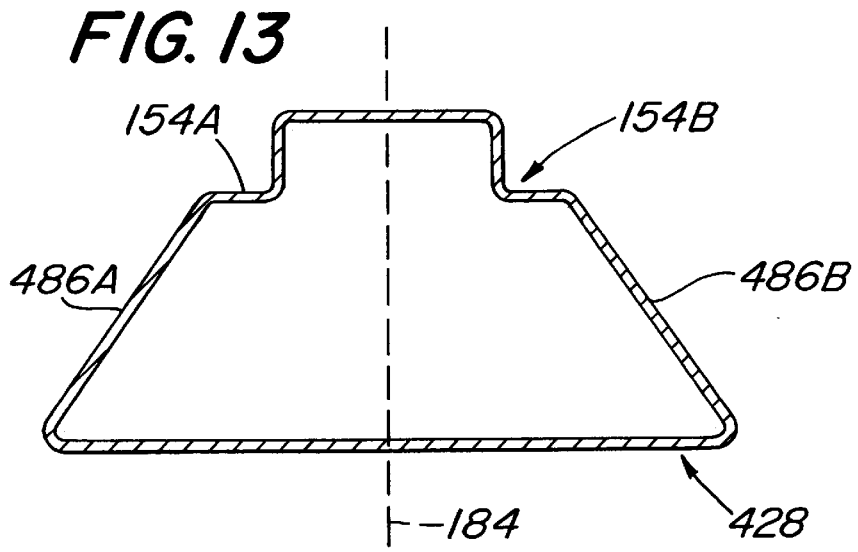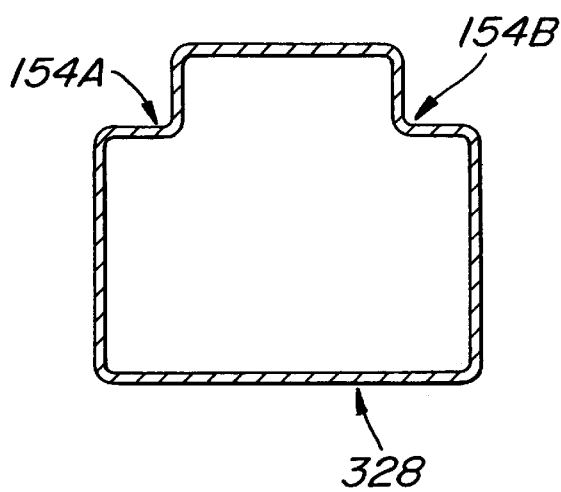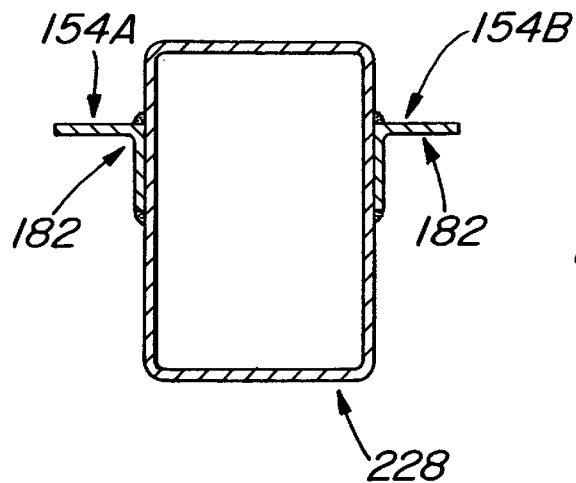

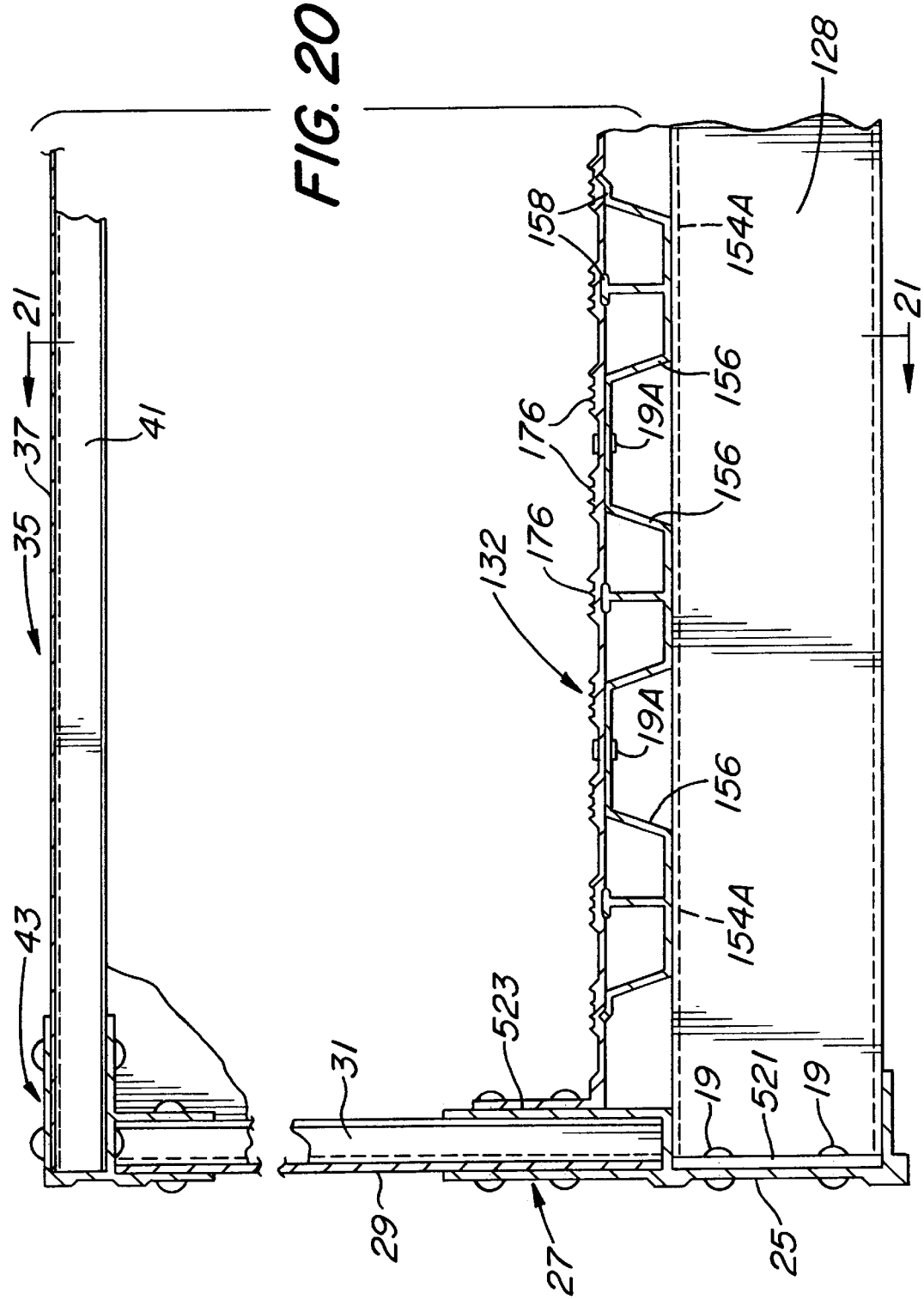

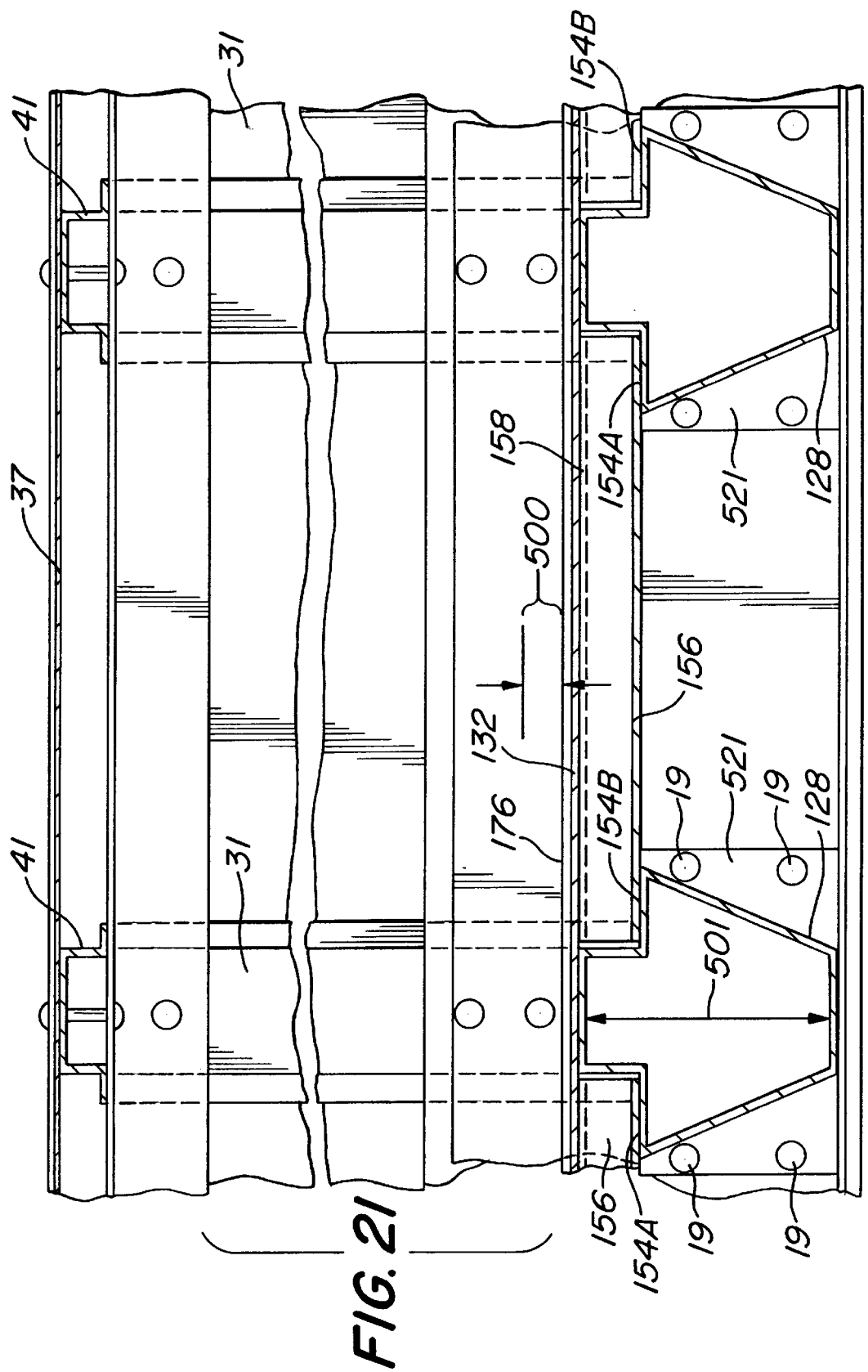

UNITIZED FLATBED TRAILER STRUCTURE AND CONTAINER TRUCK FLOOR STRUCTURE

FIELD OF THE INVENTION

The invention pertains to flatbed trailers and box-type truck structures (e.g., vans, container chassis, etc.). In particular, the invention pertains to an improved flatbed trailer design, as well as an improved van design.

BACKGROUND OF INVENTION

The main bearing members for loads placed on flatbed trailers are the pair of I-beams, generally known as the "main beams" which run longitudinally the length of the bed. Properly fabricated, the beams are flexed or curved vertically upward and designed to compress or straighten longitudinally under load. Floor supports in the form of a multiplicity of "C" channel, or "I-beam", cross members are bolted or welded perpendicularly to the webs of the main beams and directed outboard to define the width of the bed. Disposed on top of the cross members are floor sections, typically welded to each other longitudinally or butted against each other snugly and held in position by guide structures and floor screws.

Two basic problems occur in these constructions. Welding of the cross members and floor sections to the main beam reduces its load bearing strength most particularly if it is heat-treated aluminum and therefore requires a sacrifice in load capacity by as much as 20%. In the butted floor section construction, since the floor sections are essentially loose, they serve very little load bearing function and do not compress with the main beam. What they do is transmit the load to the underlying cross member which, in turn, transmits the load to the main beam. Furthermore, the typically preferred use of aluminum in flatbed trailer construction to increase load capacity is particularly defeated by extensive welding and loose floor sections tend to minimize payload.

The following U.S. patents are related to the field of truck construction.

Various types of truck body construction are disclosed in U.S. Pat. Nos. 1,962,497 (Francis); 2,818,272 (DeLay); 3,003,810 (Kloote et al.); 3,096,996 (Cole); 3,163,434 (Krueger); 3,393,920 (Ehrlich); 3,692,349 (Ehrlich); 3,843,156 (Alfriend, Jr. et al.); 4,221,427 (Sentle, Jr. et al.); 4,232,884 (DeWitt); 4,671,562 (Broadbent); 4,787,669 (Wante); 4,906,021 (Rowe et al.); 5,085,025 (Gaddis); 5,188,418 (Walworth, Jr. et al.); 5,205,587 (Orr); 5,401,050 (Baker); 5,417,453 (VanDenberg); 5,474,331 (Booher); 5,558,369 (Cornea et al.); and 5,655,792 (Booher).

Various floor constructions for trucks are disclosed in U.S. Pat. Nos. 2,485,047 (Greig); 2,773,718 (Bohlen); 4,656,809 (Wilson); 4,951,992 (Hockney); 5,054,843 (Gray).

Conventional prior art truck bed designs are depicted in FIGS. 1–3. In particular, FIG. 3 shows the typical two main rail "I-beam" 10 design whereby the main rails 10 run the length of the truck bed and are designed for supporting the payload. Each I-beam 10 comprises an upper flange 11, a lower flange 13 and a web 15. Cross members 12 are transversely coupled between the main rails 10 through the webs 15. It should be understood that U-shaped cross members 12 are depicted for example only; other conventional types of cross members could have been depicted such as I-beam, c-channel or circular cross-sectioned cross members. Flooring members 14 are then disposed in between the main rails 10 on top of the cross members 12; these flooring members 14 may have feet 16 (FIGS. 1 and 3) or even a bottom surface 18 (FIG. 2) that rest on top of the cross members 12. These feet 16 or bottom surface 18 can then be fastened to the cross members 12 by bolting or welding (not shown). In these instances, the top surface 20 of the flooring member 14, where the payload is eventually positioned, is thus set off from the top surface 22 of the cross member 12.

However, in such a design the three main components, i.e., the main rails 10, the cross members 12 and the flooring member 14, all work independently of each other. Such a design does not efficiently transfer the load from the payload into the main rails 10. When the payload is positioned on the flooring members 14 for transport, the weight is transferred through the top surface 20 of the flooring member 14, through the feet 16 and bottom surface 18 (if present), through the cross members 12 and eventually to the main rails 10. In contradistinction, the optimum design would have the payload resting directly on the main rails 10, i.e., unitizing of the top surface of the flooring member 14 with the top surface of the cross members 12 and the main rails 10.

Thus, there remains a need for a lightweight, integrated flatbed design that effectively makes the top surface of the floor the top surface of the main rails and the top surface of the cross members, thereby allowing the direct transfer of load from the payload to the main rails.

OBJECTS OF THE INVENTION

Accordingly, it is the general object of this invention to overcome the disadvantages of the prior art.

It is an object of the present invention to provide a flatbed trailer design having main rails, cross members and flooring members that act dependently on each other.

It is still yet another object of the present invention to provide a flatbed trailer design having flooring members that operate as the top flange of the main rails, thereby increasing the strength of the main rails.

It is still yet another object of the present invention to provide a flatbed trailer design having flooring members that operate as the top flange of the cross members.

It is an object of the present invention to provide a flatbed trailer design that unitizes the upper surface of the floor with the top surface of the main rails, thereby optimizing the strength of the main rail.

It is another object of the present invention to increase the number of main rail support points for the cross members.

It is another object of the present invention to reduce the unsupported length of the cross members, thereby reducing the size of the cross members.

It is another object of the present invention to provide a flatbed trailer design that unitizes the upper surface of the floor with the top surface of the cross member, thereby optimizing the strength of the cross members.

It is even yet another object of the present invention to reduce the number of lower cross members in a flatbed trailer, thereby further reducing the weight of the trailer.

It is another object of the present invention to provide a van or box trailer or container design that presents more storage room by lowering the floor height while maintaining the necessary payload support.

It is still another object of the present invention to reduce the number of cross members required in a van, box trailer or container design but still retain the same unsupported length of the flooring member between the cross members.

It is even yet a further object of the present invention to reduce the weight and assembly time of the van, box trailer or container design by reducing the number of cross members.

It is yet another object of the present invention to provide a van or box trailer or container design that presents more storage room by lowering the floor height while maintaining the same size cross member.

It is still yet another object of the present invention to provide a van or box trailer or container design that presents more storage room by lowering the floor height while reducing the size of the cross member.

It is still yet another object of the present invention to provide a van or box trailer or container design that is strengthened while lowering the floor height.

It is another object of the present invention to increase the payload carrying capacity while reducing the weight of the truck or van, box trailer or container design.

SUMMARY OF THE INVENTION

These and other objects of the instant invention are achieved by providing a vehicle (e.g., a flatbed trailer) having a longitudinal axis and comprising: at least two main rails oriented parallel to the longitudinal axis of the vehicle, a plurality of cross members oriented transversely of the longitudinal axis and through the at least two main rails, and flooring members assembled the said cross members and with the at least two main rails that form an upper flange of the at least two main rails.

These and other objects of the instant invention are also achieved by providing a vehicle (e.g., a flatbed trailer) having a longitudinal axis and comprising: at least two main rails oriented parallel to the longitudinal axis of the vehicle, a plurality of cross members oriented transversely of the longitudinal axis and through the at least two main rails, and flooring members assembled with the cross members and with the at least two main rails that form an upper flange of each of the plurality of cross members.

These and other objects of the instant invention are also achieved by providing a vehicle (e.g., a flatbed trailer) having a longitudinal axis and comprising: at least two main rails oriented parallel to the longitudinal axis of the vehicle, a plurality of cross members oriented transversely of the longitudinal axis and through the at least two main rails, and flooring members assembled with the cross members and with the at least two main rails, thereby forming an upper flange of the at least two main rails and an upper flange of each of the plurality of cross members.

These and other objects of the instant invention are also achieved by providing a vehicle (e.g., a flatbed trailer) having a longitudinal axis and comprising: at least two main rails oriented parallel to the longitudinal axis of the vehicle, a plurality of cross members oriented transversely of the longitudinal axis and through the at least two main rails, and intermediate flooring support members disposed in between the plurality of cross members for supporting flooring members thereon.

These and other objects of the instant invention are also achieved by providing a vehicle (e.g., a flatbed trailer) having a longitudinal axis and comprising: at least two main rails oriented parallel to the longitudinal axis of the vehicle and each of the at least two main rails comprising a plurality of webs; a plurality of cross members oriented transversely of the longitudinal axis and through the at least two main rails; and the plurality of webs providing more than two points of support for each one of the plurality of cross members, thereby reducing the unsupported length of each one of the plurality of cross members.

These and other objects of the instant invention are also achieved by providing a vehicle (e.g., a flatbed trailer) having a longitudinal axis and comprising: at least two main rails oriented parallel to the longitudinal axis of the vehicle; a plurality of cross members oriented transversely of the longitudinal axis and through the at least two main rails; and wherein each of the cross members comprises shoulders for supporting intermediate flooring support members thereon to support flooring members in between the cross members.

These and other objects of the instant invention are also achieved by providing a vehicle having a box-type structure (e.g., vans, refrigerated vans, container chassis, etc., that only utilize cross members with no main rails) and having a longitudinal axis, whereby the vehicle comprises: a plurality of cross members oriented transversely of the longitudinal axis; and flooring members assembled with the plurality of cross members to form an upper flange of each of the plurality of cross members.

These and other objects of the instant invention are also achieved by providing a vehicle having a box-type structure (e.g., vans, refrigerated vans, container chassis, etc., that only utilize cross members with no main rails) and having a longitudinal axis, whereby the vehicle comprises a plurality of cross members oriented transversely of the longitudinal axis; and intermediate flooring support members disposed in between the plurality of cross members for supporting flooring members thereon.

These and other objects of the instant invention are also achieved by providing a vehicle having a box-type structure (e.g., vans, refrigerated vans, container chassis, etc., that only utilize cross members with no main rails) and a longitudinal axis and wherein the vehicle includes a roof that acts as a top flange to the box-type structure and comprises: a plurality of cross members oriented transversely of the longitudinal axis; and flooring members assembled with the plurality of cross members to act as a lower flange to the box-type structure.

These and other objects of the instant invention are also achieved by providing a vehicle having a box-type structure (e.g., vans, refrigerated vans, container chassis, etc., that only utilize cross members with no main rails) and a longitudinal axis and wherein the vehicle includes a roof that acts as a top flange to the box-type structure and comprises: a plurality of cross members oriented transversely of the longitudinal axis; and wherein each of the cross members comprises shoulders for supporting intermediate flooring support members thereon to support flooring members in between the cross members.

DESCRIPTION OF THE DRAWINGS

Other objects and many of the attendant advantages of this invention will be readily appreciated as the same becomes better understood by reference to the following detailed description when considered in connection with the accompanying drawings wherein:

FIG. 3 is a partial isometric view of a prior art truck bed design showing a portion of two main rail I-beams, a portion of two cross members, and a portion of a flooring element resting on the cross members;

FIG. 4 is an isometric view, shown in cut-a-away, depicting the integrated truck bed structure of the present invention;

FIG. 6 is a view taken along line 6—6 of FIG. 5;

FIG. 6A is similar to FIG. 6 but shows one of the main rails and one of the cross members comprising a composite material;

FIG. 7 is a view taken along line 7—7 of FIG. 6;

FIG. 8 is a view taken along line 8—8 of FIG. 6;

FIG. 9 is a view taken along line 9—9 of FIG. 6;

FIG. 10 is a view taken along line 10—10 of FIG. 6;

FIG. 13 is a cross-sectional view of an alternative shouldered cross member;

FIG. 14 is a cross-sectional view of a second alternative shouldered cross member;

FIG. 15 is a cross-sectional view of a third alternative shouldered cross member;

FIG. 20 is a partial cross-sectional end-view of the present invention floor support van structure;

FIG. 21 is a view taken along line 21—21 of FIG. 20;

FIG. 21A is similar to the lower right-hand portion of FIG. 21 but shows one of the cross members comprising a composite material;

DETAILED DESCRIPTION OF THE PREFERRED EMBODIMENT

Figures 1, 2:
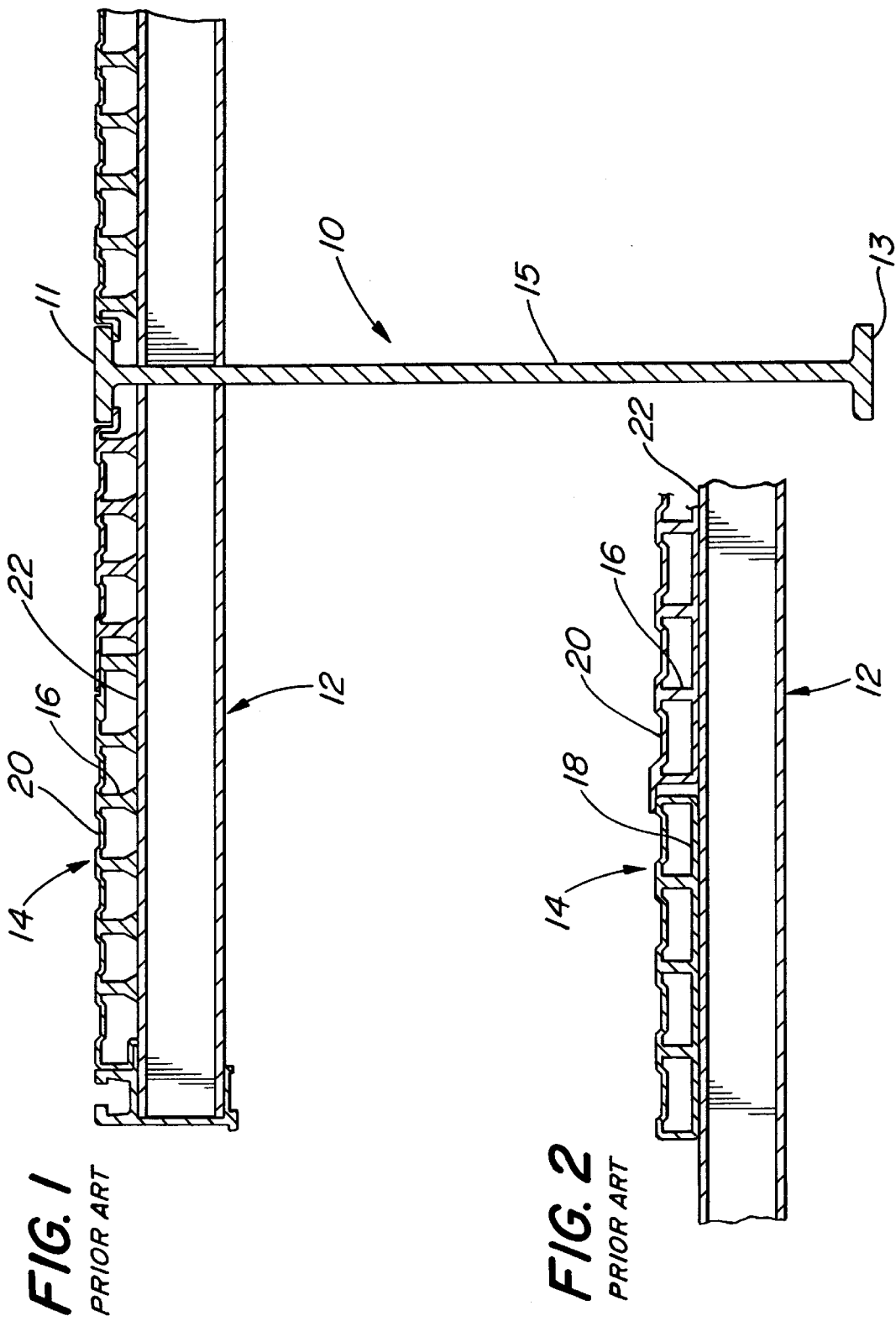
FIG. 1 is a partial, cross-sectional view of a prior art truck bed design showing one main rail "I-beam", a portion of a cross member and a portion of a flooring member resting thereon.
FIG. 2 is a partial cross-sectional view of a prior art truck bed design showing a portion of the cross member and alternative flooring member resting thereon.

Referring now in detail to the various figures of the drawing wherein like reference characters refer to like parts, there is shown in FIG. 4 at 120 an integrated truck bed structure. As shown more clearly in FIG. 5, the structure 120 comprises two main rails 122 and 124, each having a dual web 126A/126B configuration and each running parallel with a longitudinal axis 123 of the truck bed. This dual web configuration doubles the support provided to every cross member 128 since each cross member 128 has four points of support, indicated by reference numbers 130A–130D, as opposed to only two points of support for conventional cross members 12, as shown in FIG. 3. As such, this configuration reduces the unsupported length of the cross members 128 and permits the cross members 128 to be less heavy (e.g., the vertical height of the cross member 128 can be reduced and/or the wall thickness of the cross member 128 can be reduced), thereby reducing the overall weight of the truck bed.

The dual webs 126A/126B can be non-parallel (e.g., tapered) with respect to a vertical axis 127 of the main rail, as shown in FIG. 6, rather than being parallel, in order to enhance the torsional strength of the main rails 122 and 124, and reduce parallelogramming. This results in the reduction in the number of lower cross members (not shown; lower cross members typically comprise a "c"-channel or tube configuration and are disposed between the main rails 10, just above the lower flanges 13 of the main rails 10; such lower cross members are distributed every 6–8 feet along the length of the truck bed), thereby reducing the weight and assembly time of the truck bed.

Each main rail 122 and 124 may comprise, but is not limited to, a composite material (see FIG. 6A), thereby reducing the weight of each main rail while maintaining its strength.

A key feature of the present invention is that each main rail 122 and 124 has its top flange or surface formed by the flooring member 132, thereby greatly increasing the strength of each main rail 122 and 124. As can be seen most clearly in FIG. 5, each main rail 122 and 124 is open at the top. When the cross members 128 are installed and the flooring member 132 put in place, the flooring member 132 itself forms the top flange of the main rails 122 and 124. Since the strength of a beam is defined by its section modulus value, which is defined by, among other things, the height of the beams and the areas of the web, the top flanges and the bottom flanges, the value is greatly increased when the area of the top flange is defined by the relatively large area of the flooring member 132 as compared to the area of, for example, the top flange 11 shown in FIG. 3.

Figure 5:
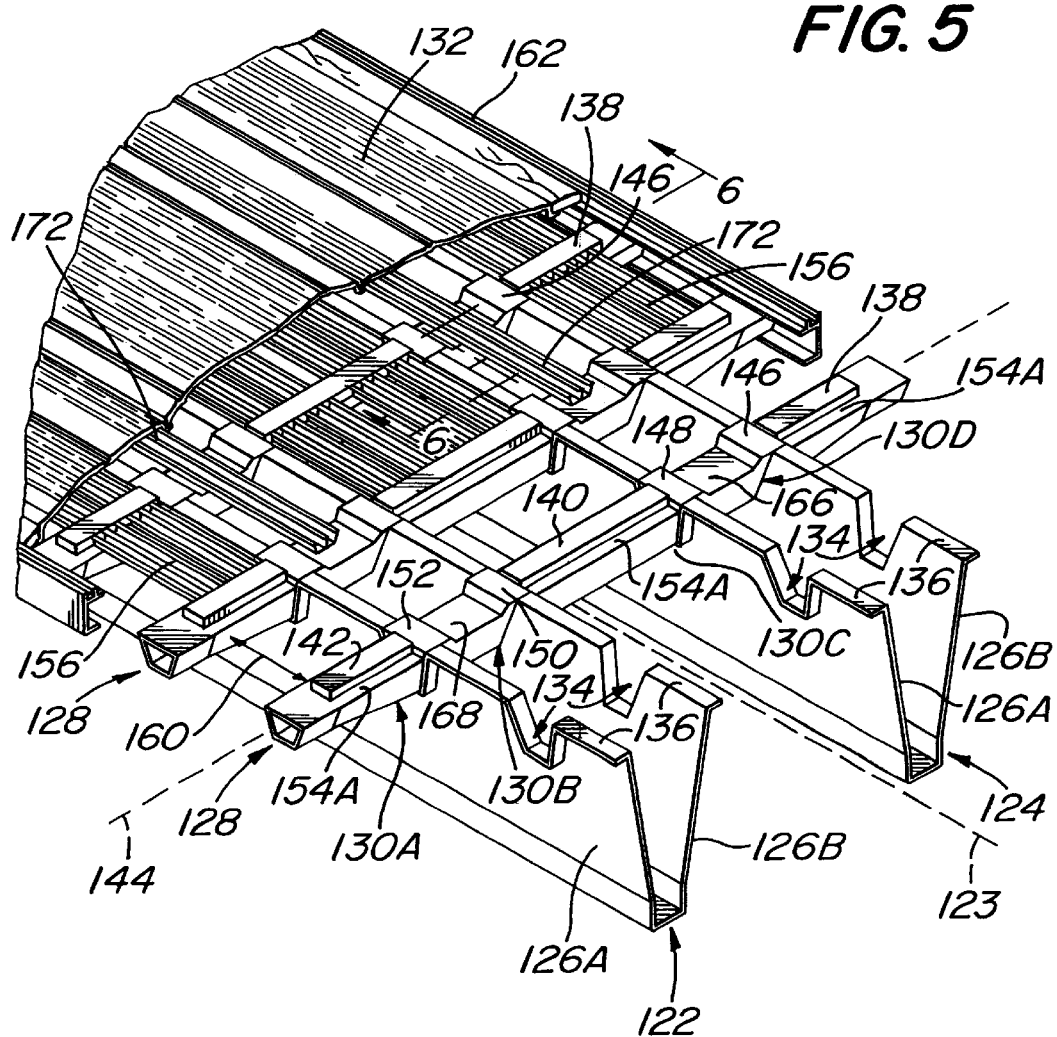
FIG. 5 is an enlarged isometric view, shown in cut-a-away, depicting the dual web main rails, the shouldered cross members and the flooring members.
Figure 11:
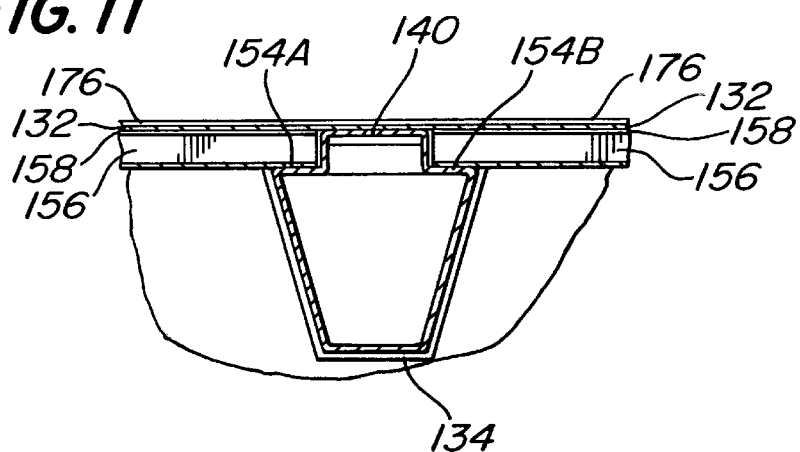
FIG. 11 is a view taken along line 11—11 of FIG. 6.

Each web 126A/126B of each main rail 122 and 124 comprises a plurality of recesses 134 along the upper edges 136 for supporting the cross members 128 therein. As can be seen in FIG. 5, the recesses 134 are aligned transversely for supporting the cross members 128 therein.

As shown most clearly in FIGS. 5–11, each cross member 128 is constructed to be non-uniform in cross-section for achieving a number of purposes, including optimum transference of load to the main rails 122/124, reduction in length of unsupported flooring members and the lowering of floor height, thereby increasing storage space. The following is a discussion of the non-uniform cross member 128 as depicted in FIGS. 5–11. However, it should be understood that the non-uniform cross member 128 is exemplary only and that it is within the broadest scope of this invention to include various designs of such non-uniform cross members and is not limited to those depicted in FIGS. 5–11. Furthermore, it should be understood that the different cross-sections discussed below may comprise discrete portions secured to one another or may comprise a unitary piece. The important feature is that the various cross-sections of the cross member provide the discussed functions. While a non-uniform cross-section is preferred, a cross member 128 of uniform cross-section could also be used for the various designs.

Each of the cross members 128 comprises a plurality of risers along the upper portion of the cross member. These risers allow the flooring member 132 to be directly connected to the cross members 128 and main rails 122/124, as will be discussed below (FIGS. 6, 8–9 and 11). Three of the risers, namely risers 138, 140 and 142 (hereinafter the "longitudinal risers") are aligned along the longitudinal axis 144 of the cross member 128 and four of the risers, namely 146–152 (hereinafter, the "transverse risers") are aligned transversely of this longitudinal axis 144. All of the longitudinal risers 138–142 have widths that are smaller than the cross member 128, thereby creating a pair of shoulders 154A/154B (FIG. 8 depicts shoulder 154B) for supporting the ends of intermediate flooring support members 156. The flooring member 132 is thus supported by these members 156 (which include upper feet 158, see FIG. 6) in between cross members 128 (FIG. 8). As a result, because these shoulders 154A/154B permit the insertion of the intermediate flooring support member 156, the unsupported length 153 of the flooring member 14 (see FIG. 3) between cross members 12 can be retained with less cross members. A "keystone"-shaped cross member 128 placed on 21" centers can provide the same floor support as an "I-beam" placed on 15" centers, as indicated by reference number 160 (FIG. 5). Thus, the longitudinal risers 138, 140 and 142 permit the cross members 128 to directly connect the flooring member 132, thereby effectively making the flooring member 132 work as the top (or upper) flange of the cross member 128.

Among other things, one advantage of having the top surface of the cross member 128 act as supporting the flooring member 132 directly is that such a design reduces the floor height. For example, on most vans (as discussed further below), the flooring supports are carried by the top surface of the cross members and then the flooring member is disposed on top of those supports. If the design of the present invention is used, where the top of the cross member supports the flooring member directly, approximately 1⅛–1½ inches of extra storage space height is made available. This also increases the strength of the cross members and requires fewer of them while still retaining the same unsupported length 160.

It should also be noted that the risers 138 and 142 do not extend to the extreme ends of the cross members 128 (although the risers could extend to the extreme ends); this permits the outer ends of each cross member 128 to support respective "T-slots" 162 and respective anchoring members 164 (e.g., a plank of wood); these items are used for securing the payload to the truck bed but do not form any part of the patentable invention herein.

The transverse risers 146–152 also directly carry the flooring member 132 to permit the flooring member 132 to form the top flange of the main rails 122 and 124, as discussed previously. The transverse orientation of the risers 146–152 create a pair of depressions 166 and 168 which permit the introduction of another "T-slot" 170 (FIG. 6) and/or another anchoring member (e.g., a plank of wood, not shown) to run the length of the truck bed. As can be seen most clearly in FIG. 5, continuous flooring support members 172 are also disposed in these depressions 166/168. These continuous flooring support members 172 run the length of the truck bed and they also comprise upper feet 174 (FIG. 6) for supporting the flooring member 132 (FIG. 10).

Thus, another key feature of the present invention is depicted in FIG. 5: the risers 138–152 of the cross members 128 and the upper edges 136 of the main rails are flush and thereby act together to provide a coplanar support surface for the flooring member 132.

For clarity in understanding the cross-sectional figures, namely FIGS. 7–11, it should be noted that the flooring member 132 comprises traction strips 176.

To secure the flooring member 132 to the main rails, any number of securing means can be used. One exemplary method (but not limited to that method) is to use screws/bolts, as shown in FIG. 9. In particular, a bolt 178 and nut 180 can be used to secure the flooring member 132 to the upper edge 136 of the main rails 122/124. Similarly, other bonding techniques could be used (welding, bonding agents, etc.).

FIGS. 13–15 depict alternative cross-section designs for the cross members 128. As stated earlier, it is within the broadest scope of the present invention to include cross member designs that incorporate the functions of the cross member 128 described above. For example, a cross member may include a "shoulder" function for carrying flooring member supports while at the same time providing an upper surface for supporting the flooring member 132 directly, thereby resulting in the flooring member 132 forming the top (or upper) flange of the cross member 128. One exemplary means is to use a riser element (e.g., risers 138–152), as described above. Similarly, other shoulder means, such as the one depicted in FIG. 15 by the use of right-angled supports 182 could be used in a cross member 228, or a unitary cross member 428 (FIG. 13, a trapezoidal-shaped cross section) and cross member 328 (FIG. 14, a rectangular-shaped cross section). The important function is that in all of these alternative designs, the flooring member forms the top (or upper) flange of the cross members.

To increase the stability of the cross member, the sides 186A/186B of the cross member 128 are non-parallel (e.g., tapered) with respect to a vertical axis 184 (FIG. 8). As with the non-parallel webs of the main rail, such tapering prevents "parallelogramming" of the cross member 128. Similarly, the sides 486A/486B of the cross member 428 can be tapered in the opposite direction with respect to the vertical axis 184, as shown in FIG. 13.

Figure 12:
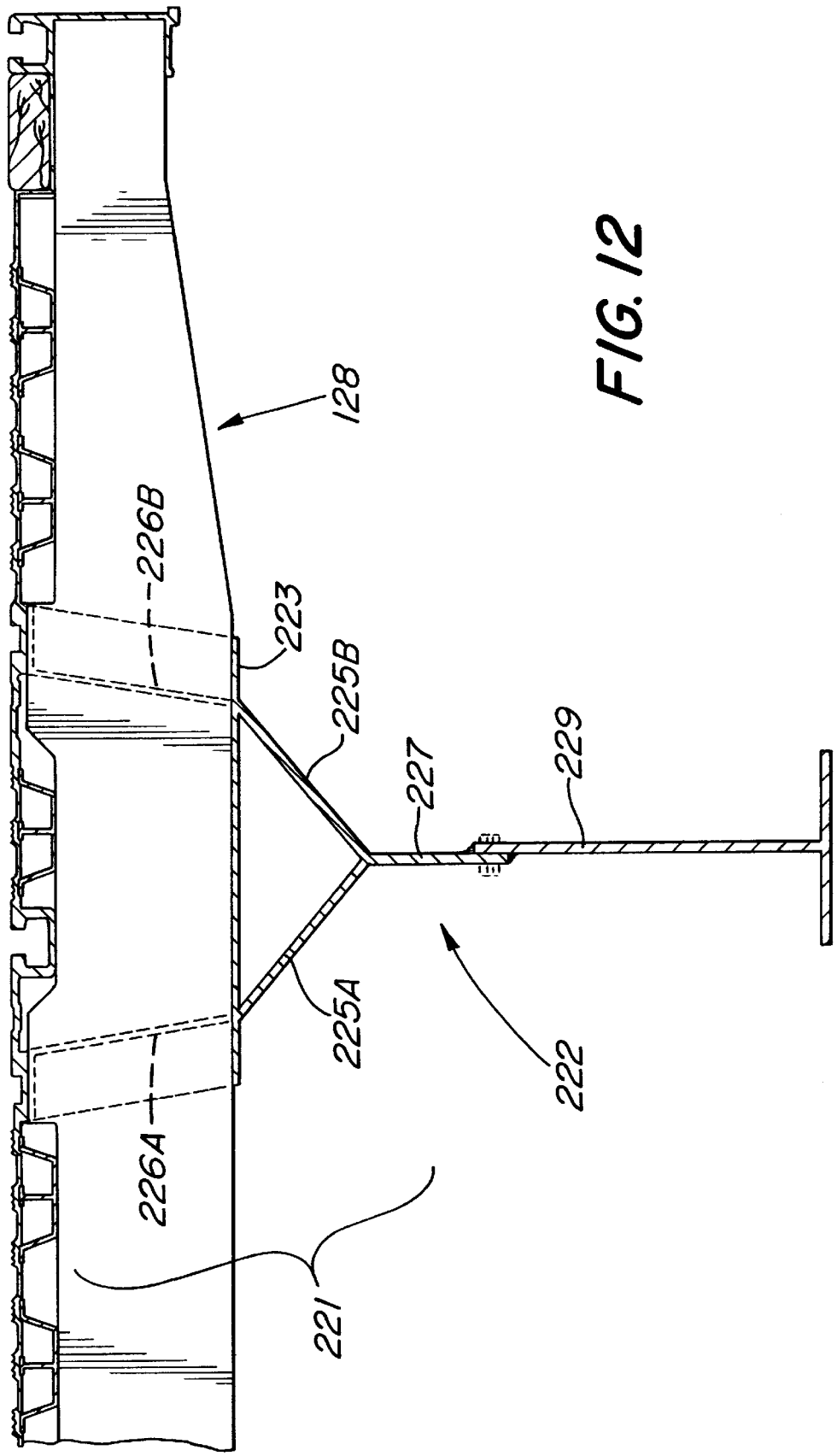
FIG. 12 is a partial cross-sectional view of an alternative dual web main rail design.

An alternative main rail design is depicted in FIG. 12. In this embodiment, the dual web construction is confined to the upper portion of the main rail. To that end, the main rail 222 comprises an extruded upper half 221 having a planar support surface 223 from which project a pair of webs 226A and 226B which contain respective recesses (not shown) for receiving the cross member 128 therein. The planar support surface 223 is itself supported by a pair of angled strut surfaces 225A/225B. The lower ends of these angled strut surfaces 225A/225B are formed into a single strut 227. The single strut 227 is then coupled (e.g., welded or bolted) to a bottom support strut 229 completing the main rail of the trailer.

As mentioned earlier, one advantage of having the top (or upper) flange of each cross member 128 formed by the flooring surface 132 is that such a design reduces the floor height. In trucks without main rails, such as vans, refrigerated vans, container chassis or any box-type truck structures, the integrated floor and cross member design reduces the height of the floor and cross members, resulting in more interior space while increasing both the trailer structural strength and the cross member strength. It also reduces the number of cross member required, therefore reducing weight and assembly time. The following discussion concerns a van structure, although it should be understood that this is by way of example only, and not limitation, and that vans, refrigerated vans, container chassis or any box-type truck structure is also covered by the following discussion.

Figure 16:
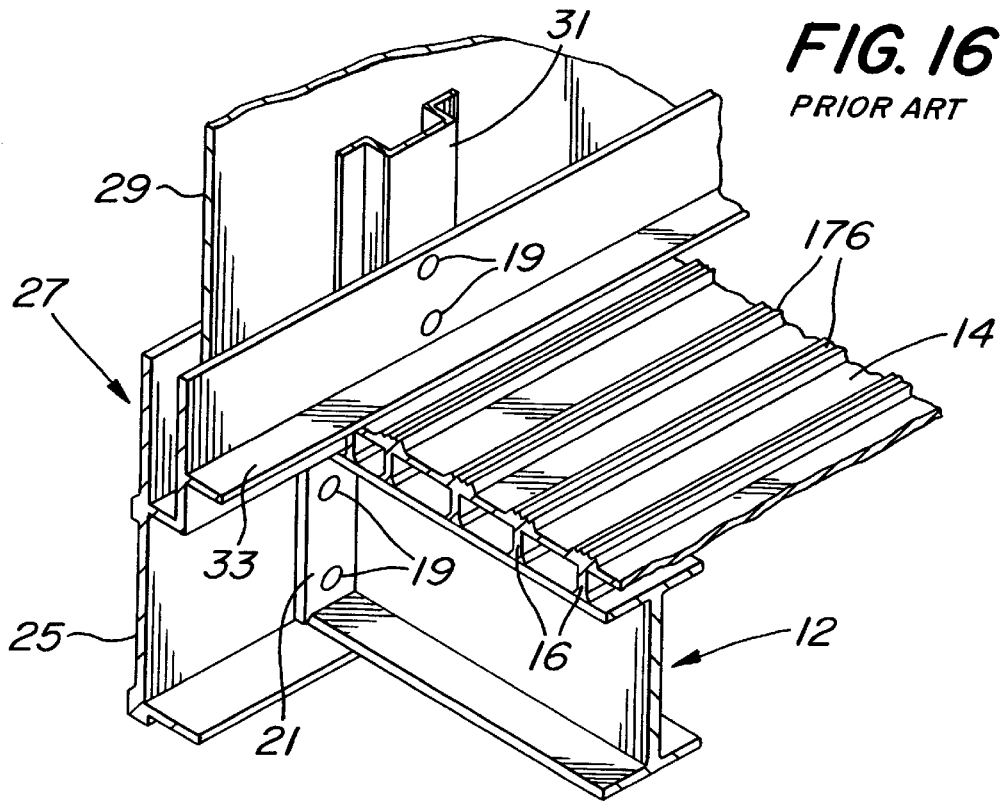
FIG. 16 is a partial isometric view of the floor support of a conventional van.
Figure 17:
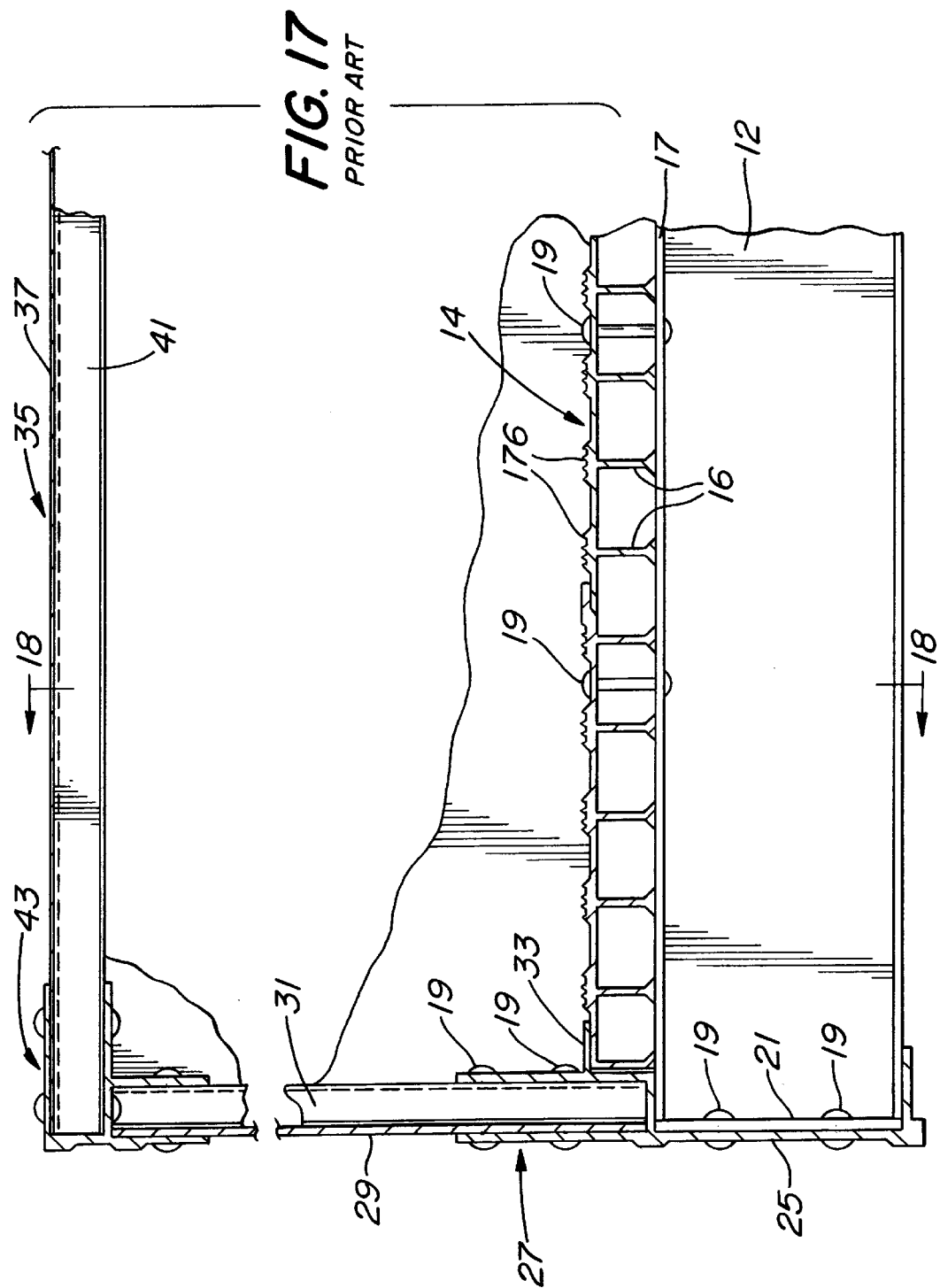
FIG. 17 is a partial cross-sectional end-view of a conventional van structure.
Figure 18:
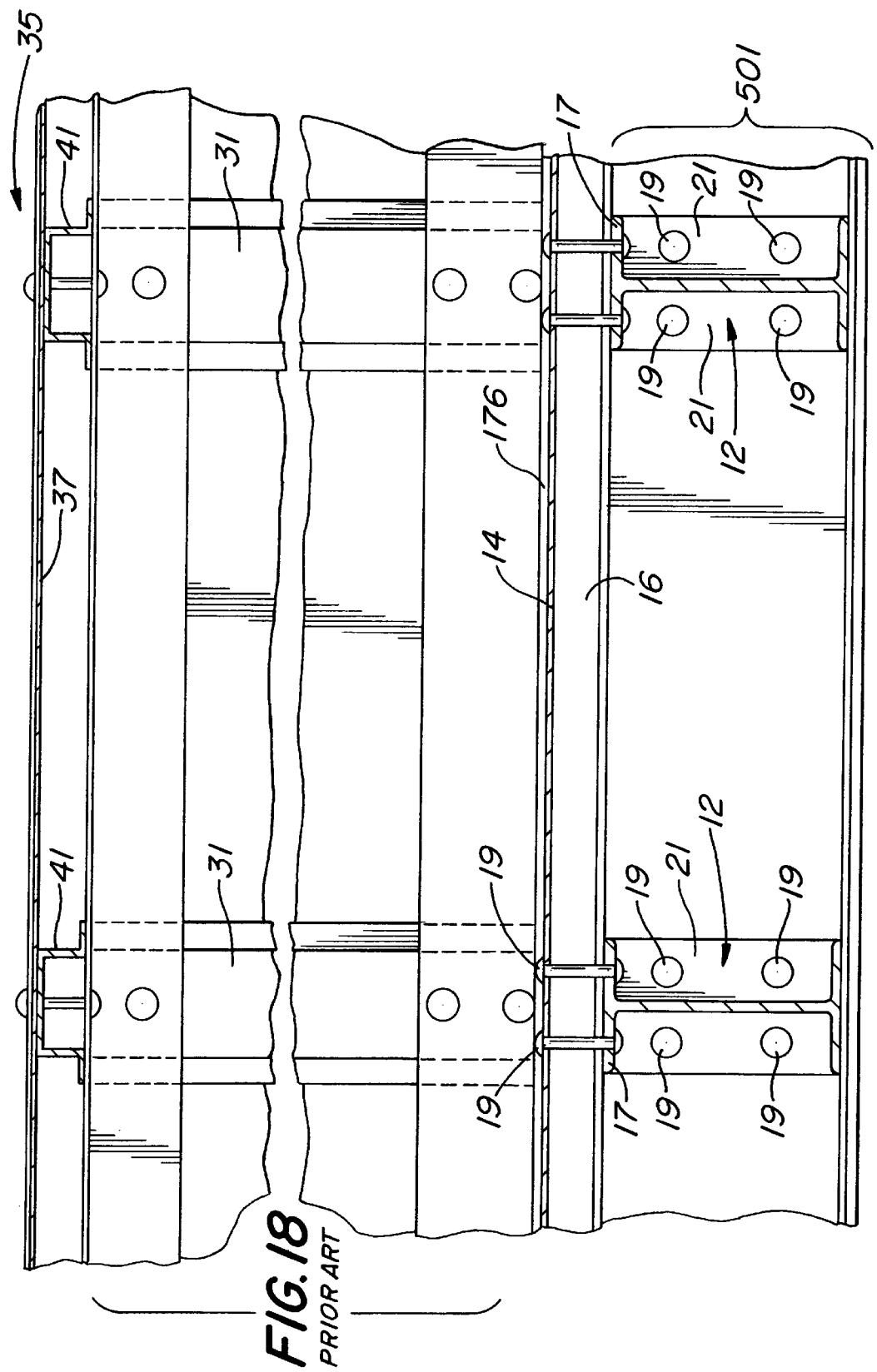
FIG. 18 is a view taken along line 18—18 of FIG. 17.

FIGS. 16–18 depict the conventional van structure (e.g., U.S. Pat. No. 3,692,349 (Ehrlich)) whereby no main rails are used but only cross members 12. In particular, the cross members 12 are typically "I-beams" and whose upper flange 17 supports the feet 16 of the flooring member 14 (e.g., aluminum or wood). The cross members 12 are secured to the sides of the van by rivets 19 that secure each cross member mounting plate 21 to a lower corner extrusion 25. The upper portion of the extrusion 25 comprises a U-shaped member 27 that contains the outer skin 29 of the van as well as a side support 31. Rivets 19 also secure all these members together. A projecting flange 33 on the inside surface of the U-shaped member 27 permits the flooring member 14 ends to be inserted thereunder, thereby forming a loose floor connection. The flooring member 14 can then be further secured to the top flange of the cross member 12 with rivets 19 (or bolts or screws), as shown in FIG. 18. The roof 35 of the van is formed by a roof skin 37 that is supported by a roof support 41. The ends of the roof skin 37 and the roof support 41 are secured inside upper corner extrusions (only one 43 of which is shown), similar to the lower corner extrusion 25; rivets 19 are also used.

Figure 19:
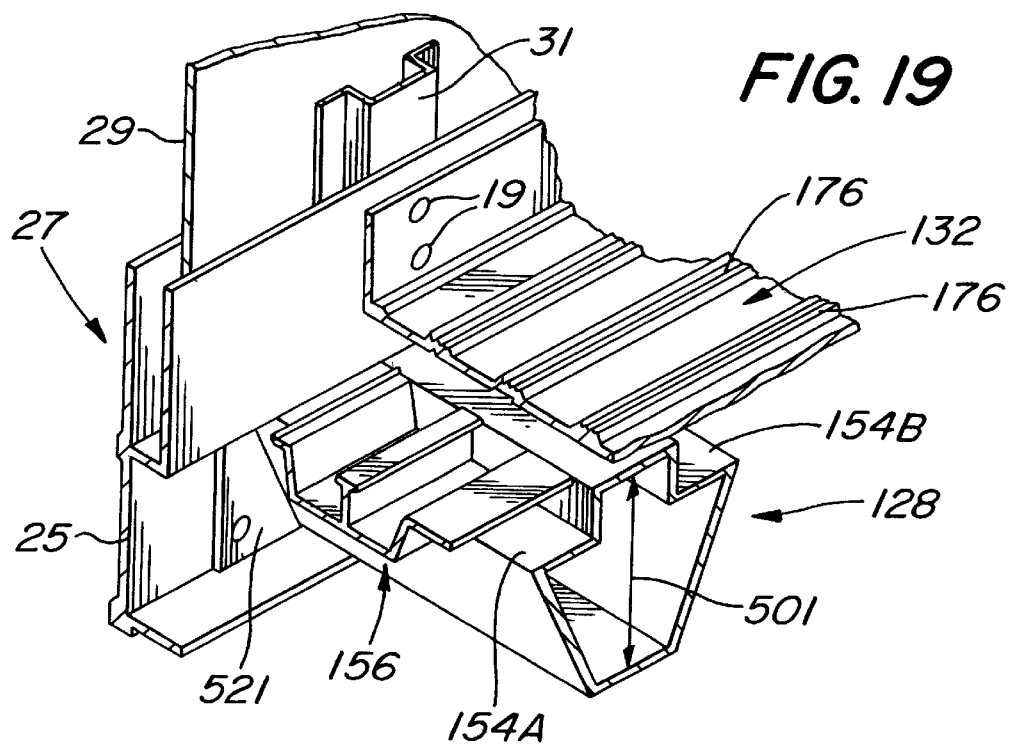
FIG. 19 is a partial isometric view of the present invention floor support for a van.

In contradistinction, with the present invention cross member 128 installed (FIGS. 19–21) in the van, the flooring height can be reduced, the reduction in flooring height being depicted by the reference number 500 in FIG. 21, while maintaining the same size (501) cross member 128. This reduction in height can be directly observed by overlaying FIG. 21 (present invention) on top of FIG. 18 (prior art). Thus, the present invention permits the same size (the vertical dimension of the cross members shown in FIG. 18 and FIG. 21) cross member and the same size flooring (reference number 14 in FIG. 18 and reference number 132 in FIG. 21) to be used while lowering the floor height, thereby providing more storage space in the van, and while strengthening the van structure. This added strength to the van structure occurs because the entire flooring member 132 acts as the top (or upper) flange of the cross members 128 (FIGS. 19–21). In contradistinction, since the flooring member 14 (FIG. 17) of a conventional van is simply resting on top of the cross members 12, the flooring member 14 provides no added strength to the cross member 14 and to the overall van structure. Typically, the box-like structure of the van can be considered like an "I-beam" whereby the top roof supports acts as the top flange of the "I-beam", the sidewalls of the van act as the web of the "I-beam" and the cross member acts as the bottom flange. However, with the present invention installed, the entire flooring member 132 and the cross members 128 act as the lower flange of this "I-beam", thereby greatly increasing the strength of the van structure. Because the design of the present invention increases the strength of the van structure, less cross members need to be used, thereby reducing the weight of the van.

In particular, as shown in FIG. 19, the cross member 128 of the present invention is shown with the intermediate floor support member 156 on a front shoulder 154. Thus, as with the cross member design discussed earlier with respect to the truckbed, the flooring member 132 forms the top (or upper) flange of the cross member 128 and, thereby, this shouldered cross member 132 has all of the strength advantages discussed previously while at the same time lowering the floor height to provide more storage space in the van.

The cross member 128 in the van is secured to the lower corner extrusion 25 by a cross member mounting plate 521 by rivets 19. In addition, rather than forming a loose floor connection at the sides of the flooring member as in the conventional van, the flooring member 132 comprises vertical flanges 523 that are fixedly secured to the U-shaped member 27 of the lower corner extrusion 25 via rivets 19; this forms a direct connection of the flooring member 132 to one side of the U-shaped member 27. Alternatively, although not shown, it is also within the broadest scope of the present invention to have the vertical flanges 523 be integral with the U-shaped member 27, rather than having the flanges 523 riveted to the U-shaped members 27; thus, a one piece member is thus formed between the flooring member 132 and the U-shaped member 27. Furthermore, as shown in FIG. 20, rivets 19A are shown which secure the flooring member 132 to the intermediate flooring support member 156.

Attempting to provide more storage space in the van may be accomplished by simply reducing the combination height of the flooring member 14 and cross member 12 i.e., reducing the vertical dimension of these two components since the flooring member 14 rests on top of the cross members 12. However, doing so sacrifices the strength of the flooring structure (as well as the overall van structure). In contradistinction, with the unitized flooring member 132/ cross member 128 design of the present invention installed, the same size cross member 128 and flooring member 132 may be used, i.e., there is no need to reduce the size of these components.

Figure 22:
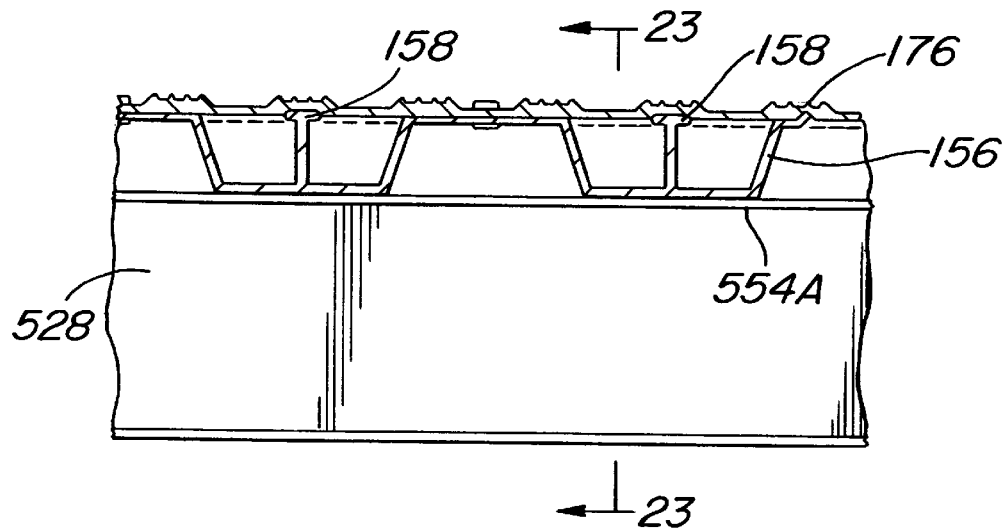
FIG. 22 is a partial cross-sectional end-view of another embodiment of the present invention that forms a portion of the floor support for a van.
Figure 23:
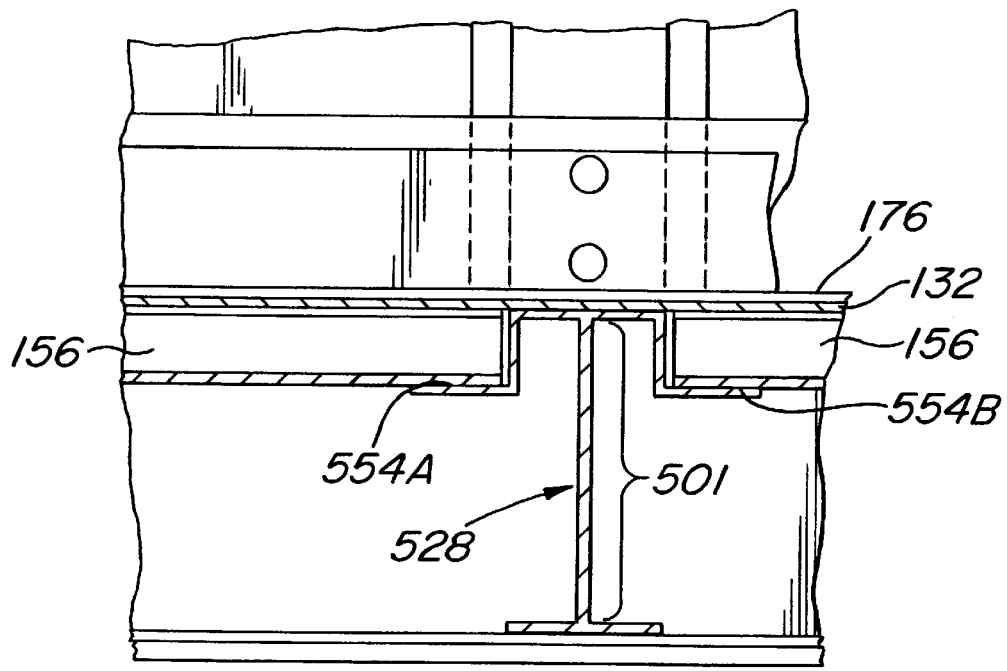
FIG. 23 is a view taken along line 23—23 of FIG. 22.

FIGS. 22–23 depict an alternative cross member design for a van structure (or any of the other container truck structures) which is within the scope of the present invention that does not require the size of the cross member to be reduced. This alternative cross member is shown at 528 in FIG. 23. In particular, the cross member 528 has an "I-shaped" cross section but has integral shoulder members on each side of its top portion, indicated by 554A and 554B. As can be appreciated by those skilled in the art, this modified top portion of cross member 528 also permits the lowering of the floor height while maintaining the same size cross member (and, therefore, the same strength), i.e., the height 501 of the cross member 528 is the same as for cross member 128. The forward shoulder 554A and rear shoulder 554B support intermediate flooring support members 156 which in turn support the flooring member 132. As with the other cross member embodiments discussed above, the flooring member 132 thus also forms the top (or upper) flange of the cross member 528.

Although one of the advantages of the present invention is that there is no need to reduce the size 501 of the cross members or the flooring members to achieve the increase in storage space, the size 501 of the cross member 128, or cross member 528, can be reduced; this is because the unitized design permits the entire flooring member 132 to act as the top flange of the cross members 128, thereby greatly increasing the strength of the payload support structure. Thus, by decreasing the size of the cross member 128, the van can be made even lighter while maintaining its payload support capacity.

It should be noted that the cross members 128 of the van may have any of the cross sectional shapes depicted in FIGS. 7–15 with regard to the flatbed trailer.

It should be further noted that the main rails, both the intermediate flooring support members and the continuous flooring support members, and the cross members (all embodiments) may be constructed of composite (see FIGS. 6A and 21A); however, the flooring members 132 are preferably constructed of aluminum for providing better stiffness and because aluminum provides for better shock resistance.

Without further elaboration, the foregoing will so fully illustrate my invention that others may, by applying current or future knowledge, readily adopt the same for use under various conditions of service.

I claim:

1. A flatbed trailer apparatus having a longitudinal axis, said apparatus comprising:
   at least two main rails oriented parallel to the longitudinal axis of said apparatus and a plurality of cross members coupled to said at least two main rails;
   each of said plurality of cross members comprising shoulder portions;
   intermediate flooring support members disposed in between said plurality of cross members and having ends supported by said shoulder portions; and
   continuous flooring members disposed on top of said intermediate flooring support members.

2. The flatbed trailer apparatus of claim 1 wherein each of said plurality of cross members comprises a keystone-shaped cross section to form said shoulder portions.

3. The flatbed trailer apparatus of claim 1 wherein each of said plurality of cross members comprises a trapezoidal-shaped cross section to form said shoulder portions.

4. The flatbed trailer apparatus of claim 1 wherein each of said plurality of cross member comprises a rectangular-shaped cross section to form said shoulder portions.

5. The flatbed trailer apparatus of claim 1 wherein each of said plurality of cross members comprises sides oriented transversely to the longitudinal axis of said apparatus and wherein said shoulder portions are formed of right-angled members secured on each side of said cross members.

6. The flatbed trailer apparatus of claim 1 wherein said at least two main rails comprise composite material.

7. The flatbed trailer apparatus of claim 1 wherein each of said plurality of cross members comprises composite material.

8. The flatbed trailer apparatus of claim 1 wherein each of said at least two main rails is formed of at least two substantially vertical and adjacent webs that are interconnected at their lower ends.

9. The flatbed trailer apparatus of claim 1 being unitized wherein each of said at least two main rails comprises upper ends formed to receive a portion of said plurality of cross members such that a top surface of each of said plurality of cross members and a top surface of said upper ends are substantially coplanar when said plurality of cross members are coupled to said at least two main rails, and wherein said continuous flooring members are disposed on top of said upper ends and on top of said plurality of cross members, said continuous flooring members being secured to said upper ends to form an upper flange of each of said at least two main rails to unitize said continuous flooring members with said at least two main rails.

* * * * *